United States Patent [19]
Acharya et al.

[11] Patent Number: 6,154,493
[45] Date of Patent: Nov. 28, 2000

[54] COMPRESSION OF COLOR IMAGES BASED ON A 2-DIMENSIONAL DISCRETE WAVELET TRANSFORM YIELDING A PERCEPTUALLY LOSSLESS IMAGE

[75] Inventors: Tinku Acharya, Tempe; Lina J. Karam, Phoenix; Francescomaria Marino, Tempe, all of Ariz.

[73] Assignee: Intel Corporation, Santa Clara, Calif.

[21] Appl. No.: 09/083,383

[22] Filed: May 21, 1998

[51] Int. Cl.[7] ................................... H04N 7/12
[52] U.S. Cl. .................. 375/240.19; 375/240.11; 348/398.1
[58] Field of Search .................. 348/395–398, 348/400, 403–404, 398.1; 382/166, 240, 248, 250–251; 375/240, 240.11, 240.18, 240.19

[56] References Cited

U.S. PATENT DOCUMENTS

| | | | |
|---|---|---|---|
| 5,412,427 | 5/1995 | Rabbani et al. | 348/394 |
| 5,495,292 | 2/1996 | Zhang et al. | 348/407 |
| 5,541,653 | 7/1996 | Peters et al. | 348/264 |
| 5,602,589 | 2/1997 | Vishwanath et al. | 348/498 |
| 5,790,705 | 8/1998 | Anderson et al. | 382/244 |
| 5,850,482 | 12/1998 | Meany et al. | 382/232 |
| 5,880,856 | 3/1999 | Ferriere | 358/434 |
| 5,901,242 | 5/1999 | Crane et al. | 382/166 |

FOREIGN PATENT DOCUMENTS

682438A1  11/1995  European Pat. Off. ......... H04N 1/40

OTHER PUBLICATIONS

Toi et al, "A Subband Coding Technique for Image Compression in Single CCD Cameras with Bayer Color Filter Arrays", IEEE Trans. on Cons. Electronics, vol. 45, No.1, pp. 176–180, Feb. 1999.

Le Gall et al, "Subband Coding of Digital Images Using Symmetric Short Kernel Filters and Arithmetic Coding Techniques", IEEE, Bell Communications Research, Inc., pp. 761–764, Feb. 1999.

*Primary Examiner*—Vu Le
*Attorney, Agent, or Firm*—Blakely, Sokoloff, Taylor & Zafman LLP

[57] ABSTRACT

What is disclosed is a method that includes splitting raw image data into a plurality of channels including color plane difference channels, and then compressing separately each of these channels using a two-dimensional discrete wavelet transform, the compression utilizing quantization, whereby the recovery of the compressed channel data yielding a perceptually lossless image. The method and apparatus operates on images directly in their Bayer pattern form. Quantization thresholds are defined for the quantizing which may vary depending upon the channel and DWT sub-band being processed.

28 Claims, 7 Drawing Sheets

| Sub-Band Channel | Level 1 2D-DWT | | | Level 2 2D-DWT | | | Level 3 2D-DWT | | |
|---|---|---|---|---|---|---|---|---|---|
| | S1 | S2, S3 | S4 | S11 | S12, S13 | S14 | S111 | S112, S113 | S114 |
| R | 1 | 22 | 100 | 1 | 15 | 51 | 15 | 15 | 30 |
| G (i.e., G1 or G2) | 1 | 20 | 90 | 1 | 15 | 40 | 15 | 14 | 26 |
| B | 1 | 24 | 130 | 1 | 18 | 65 | 15 | 17 | 39 |
| R-G1 | 1 | 70 | ∞ | 1 | 42 | 90 | 22 | 202 | 50 |
| B-G2 | 1 | 105 | ∞ | 1 | 65 | 130 | 52 | 53 | 106 |

FIG. 5

COMPRESSION OF COLOR IMAGES BASED ON A 2-DIMENSIONAL DISCRETE WAVELET TRANSFORM YIELDING A PERCEPTUALLY LOSSLESS IMAGE

BACKGROUND OF THE INVENTION

1. Field of the Invention

The invention relates generally to image processing. More specifically, the invention relates to encoding and quantization for image compression.

2. Description of the Related Art

When an image is captured of a scene, environment or object, the image is represented by an array of locations known as pixels. Each pixel of an image has a value relating to one or more color planes. When an image is captured by an imaging device such as a digital camera it is often captured into a Color Filter Array (CFA) pattern known as the Bayer pattern. In the Bayer pattern, each pixel location is an intensity value relating to only one of the three primary rendering colors (Red (R), Green (G) and Blue (B)). The Bayer pattern arranges pixels as follows:

G R G R . . .

B G B G . . .

G R G R . . .

B G B G . . .

Since there are twice as many G related pixels as either of B or R pixels, the G or Green color plane may be considered as two separate color planes G1 (G pixels on the same row as R pixels) and G2 (G pixels on the same row as B pixels). Thus, a Bayer pattern "raw" image can be considered to contain four independent color planes. To obtain a full resolution color image (e.g., for rendering), each pixel location should have all three R, G and B components, not just one. To achieve this a process known as color interpolation is employed where missing color components for a pixel are estimated based on neighboring pixels.

After an image is captured and perhaps color interpolated then the image is often "compressed" or reduced in terms of the total number of bits that would be needed to store or transmit the image. Such image compression is ordinarily applied after color interpolation, but it would be advantageous in certain instances to perform suitable compression before color interpolation while an image is still in the Bayer pattern raw image format. Image compression plays a key role in multimedia applications such as video conferencing, digital imaging and video streaming over a network. Image compression schemes for such applications should be designed to reduce the bit-rate of storage or transmission of the image while maintaining acceptable image quality for the specific application.

Image compression techniques can be classified as either "lossy" or "lossless". With lossless compression, the original image prior to compression can be exactly recovered when the compressed image is decompressed. Consequently, lossless techniques, whose compression ratios depend upon the entropy of an image, do not ordinarily achieve high compression ratios and, since they preserve a high percentage of original image information, may also be computationally expensive. By contrast, lossy compression schemes provide only an approximation of the original image. Thus, with lossy compression, greater compression ratios can be achieved but often with loss in image quality compared to lossless techniques. One such lossy technique is a transform-based coding known as JPEG (Joint Photographic Experts Group) which transforms pixels of an input image using the well-known Discrete Cosine Transform (DCT). The resulting transformed pixel values are quantized or mapped to smaller set of values in order to achieve compression. The quality of a compressed image that is decompressed will depend greatly on how the quantization of the transformed pixels are performed. The compression ratio (the size of the original raw image compared to the compressed image) will also be affected by the quantization, but can be enhanced by the binary encoding of the data after quantization.

Further, high compression ratio algorithms such as JPEG suffer from deficiencies such as "blocking artifacts". For these algorithms, an image is divided into blocks of pixels such as 8×8, or 16×16 blocks. These blocks are processed independently of each other and thus, between blocks, there is an observable discontinuity in luminance or color which constitutes a "blocking artifact".

These and other image compression schemes which achieve high compression ratios and sometimes, also acceptable decompressed image quality, operate on images better when the images are in "luminance-chrominance" format. Unlike Bayer pattern or color interpolated full RGB image "spaces" (i.e. formats) which represent a pixel's color as a selected mixture of primary colors (such as red, green and blue), luminance-chrominance format images define each pixel in terms of hue and saturation levels. Since imaging devices such as digital cameras ordinarily capture images in Bayer pattern format, an image must first be color interpolated into full resolution [RGB] and then have its "color space" converted into a luminance-chrominance format such as YCrCb before luminance-chrominance techniques can be applied. Such color interpolation and color space conversion is often cost-prohibitve as well as time-consuming and thus, not desirable.

FIG. 1 shows one such traditional approach. An original image 100, captured for instance from a device such as a digital camera, is ordinarily in a raw image format such as the Bayer pattern. As such, each pixel will not have full color representation. Thus, the image is passed, either entirely at once or, block by block, to a color interpolation pixel procedure 110. The color interpolation procedure generates full-color pixels from the image 100, each pixel of which has full color resolution (e.g., R, G, and B components). The full color image is then color space converted (block 120) from RGB to YUV or other appropriate space. Such conversion may improve the compression ratio that is achievable. Once converted, the image is then passed to a primary compression procedure (block 130). Such compression may include a variety of procedures, such as JPEG or Fourier analysis, etc., but often has, as a component, a procedure known as quantization. An image is quantized by mapping a range of values representing the image pixels to a smaller range of values. After compression, the compressed image values can be encoded (block 140) such that they are suitable for transmission or storage.

This traditional approach suffers several drawbacks. First, the entire procedure is computationally complex particularly in the color interpolation and color space conversion. The color space conversion alone requires (for RGB to YCrCb space, for example) nine multiplications and six additions for each and every pixel. Often, such complicated techniques are unable to be effectively implemented in small, cost-conscious devices such as digital cameras.

If images are to be compressed on a digital camera or other imaging device, the compression techniques described above would be ineffective or prohibitive. Thus, there is a need for an image quantization and compression technique which is computationally inexpensive so as to reduce the cost of the digital cameras on which they are employed. To avoid the need for first performing color interpolation, a quantization and compression method should be developed that can be applied directly to Bayer pattern raw image data that is generated by portable imaging devices and that can exploit the correlation between different color planes to achieve high compression ratios. Additionally, there is a need for enhancing the speed of quantization and compression so that the image capture and store in local memory or transfer from the imaging device can be performed more in real-time while still preserving image quality.

SUMMARY OF THE INVENTION

What is disclosed is a method that includes splitting raw image data into a plurality of channels including color plane difference channels, which exploits the correlation of color planes that compose the raw image data, and then compressing separately each of these channels using a two-dimensional discrete wavelet transform, the compression utilizing quantization, the decompression of the compressed channel data yielding a perceptually lossless image.

BRIEF DESCRIPTION OF THE DRAWINGS

The objects, features and advantages of the method and apparatus for the present invention will be apparent from the following description in which:

FIG. 5 is a table of sample quantization threshold values for given sub-bands and channels.

DETAILED DESCRIPTION OF THE INVENTION

Referring to the figures, exemplary embodiments of the invention will now be described. The exemplary embodiments are provided to illustrate aspects of the invention and should not be construed as limiting the scope of the invention. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Figure 1:
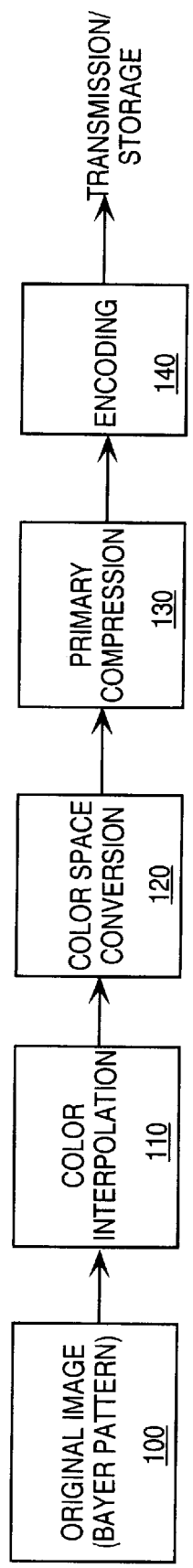
FIG. 1 shows a traditional approach to image compression.
Figure 2:
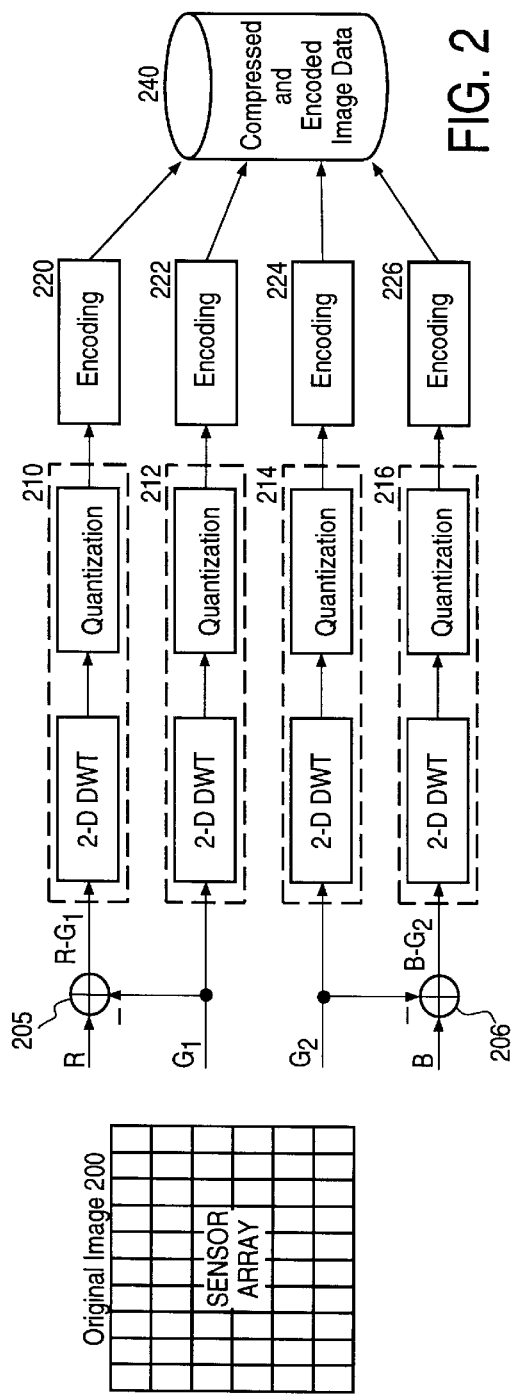
FIG. 2 illustrates image compression data flow according to one embodiment of the invention.

FIG. 2 illustrates image compression data flow according to one embodiment of the invention.

It is desirable in digital applications such as still or motion imaging that an original image such as one captured by a digital camera be compressed in size as much as possible while maintaining a certain level of quality prior to its being transferred for decompression and displayed. Ideally, the compression technique chosen can also be applied to any kind of data transfer mechanism. The disclosed compression technique, that is the subject of one or more embodiments of the invention, has been specifically developed to adaptively utilize the response of the human visual system to color and light to maintain image quality.

As mentioned earlier, a raw image that is captured by a digital camera or other similar device will typically be represented in a Bayer pattern. The sensor array 200 is a set of pixel locations or "senses" that provide for each location, an intensity value of the light incident upon the sensors from the environment/scene being imaged. In a Bayer pattern, each pixel location of an image in sensor array (hereinafter "original image") 200 will have an association with a color plane—Red(R), Green(G), or Blue(B). Since the Bayer pattern has two associated values for every R and B, the Green color plane may be considered as two planes G1 and G2. The G1 associated pixels lie in the Bayer pattern on the same row in original image 200 as R associated pixels, while G2 associated pixels lie on the same row as B associated pixels.

According to one embodiment of the invention, the correlation between an R associated pixel and its G1 associated neighboring pixel as well as the correlation between a B associated pixel and its neighboring G2 pixel are both exploited advantageously. The pixels in the Bayer pattern are capable of being subjected to compression directly without the need for color interpolation and/or color space conversion in this embodiment of the invention. The G1 and G2 associated pixels are passed directly to compression (blocks 212 and 216). The R and B pixels are treated less directly. The R pixel value is subtracted by its west neighboring G1 pixel value (block 205). This difference (R–G1) is passed to compression (block 210). Likewise, each B associated pixel is subtracted from its east neighboring G2 associated pixel (block 206). This difference (B–G2) is then passed to compression (block 216).

According to one embodiment of the invention, the difference channels, R–G1 and B–G2 are created in order to take advantage of strong correlation between color planes. These "channels" along with the G1 and G2 channels are each passed to appropriate compression stages. The pure color channels are decorrelated in one embodiment by using subtraction, but other methods of decorrelation may also be utilized. Since green is the most perceptible color (of the three—R, G and B) to the human vision system, the Green planes G1 and G2 are preserved as channels and utilized as reference channels for decorrelating Red and Blue.

Each of the four channels, R–G1, G1, G2, and B–G2 are passed to compression blocks 210, 212, 214, and 216, respectively. In each compression block 210, 212, 214 and 216, according to an embodiment of the invention, two processes occur. The first process is a 2-Dimensional Discrete Wavelet Transform (2-D DWT). The DWT is more useful in image compression than Fourier or other periodic-based transforms since it describes abrupt changes, discontinuities, and thus, edge features of images more accurately and efficiently. The 2-D DWT generates "subbands" of the image as shown and described below with respect to FIG. 4. After the DWT is performed, a second process known as quantization is performed.

Quantization is the procedure of mapping a set of n possible values to a set of m possible, where m<n. By quantizing, the total number of possible data values for the DWT image data set is reduced. The mapping is achieved according to some mathematical formula $y=f(x)$, where x is the DWT data value and y is the quantized data value. With such a formula, the number of total bits needed to represent the image is diminished. While this introduces some error, there are several methods in the art which can be employed to reduce the error. After the transformed image data is quantized, it is then encoded. Encoding 130 arranges (packs) the quantized data so that it has a convenient representation. The compressed and encoded image data may then be stored onto a media, transmitted from one system to another or distributed over a communication pathway such as a network. Further, the compressed and encoded image data need not be collected and transferred as a single frame, but can be streamed, encoded value by encoded value, out to its destination.

Depending upon the precise parameters used for DWT transformation, quantization and encoding, the compression ratio, which the size of the original image divided by the size of the compressed image, will vary. This embodiment of the invention provides for an enhanced compression process that can serve to advantageously increase decompressed image quality, decrease the complexity of decompress and optimize the compression ratio.

Given that other image compression techniques may also utilize the DWT, the quality of the decompressed image will depend in great part upon the quantization utilized. One important aspect of the invention is a perceptually lossless quantization approach, the results of which are a lossy compression that is perceived by the human vision system to be lossless when decompressed. Further, the quantization approach adopted in this embodiment of the invention is capable of fast and easy computation giving more real-time performance to the hardware on which the compression is implemented. By exploiting the property of the DWT to create sub-bands of the image, an adaptive quantization procedure is provided in one embodiment of the invention that is responsive to sub-band properties and color channel properties.

For each channel, (R–G1, G1, G2 and (B–G2), a quantization threshold value is defined for each image sub-bands generated by the 2-D DWT process. Each such threshold Q(s,c), where "s" represents the sub-band and "c", the channel, is used in quantizing the DWT result values in that channel "c" and sub-band "s". Thus, for values Xsc (or DWT coefficients used in obtaining those values), the quantized value, Ysc, is simply $$Ysc = \text{round}\left(\frac{Xsc}{Q(s, c)}\right)$$

where the function round (k) rounds up or down the value k to the nearest integer. Thus, in given sub-band and channel, the quantization is a scalar and uniform quantization formula, and, therefore, capable of fast and efficient hardware implementation. In one embodiment of the invention, the quantization thresholds modify the DWT coefficients themselves, thus eliminating the need for separate quantization (see FIG. 6 and associated description). Further, the use of a threshold adapted particularly depending on the channel and sub-band greatly enhances the quality of the recovered image upon decompression over quantization techniques that are uniform or arbitrary with respect to colors (channels) and edge perceptibility (a function of DWT sub-band resolving). The absolute error introduced during quantization is equal or less than Q(s,c)/2. In one embodiment of the invention, experimentally derived values for Q(s,c) are determined such that the error leads to no perceptual loss of image quality.

Figure 3:
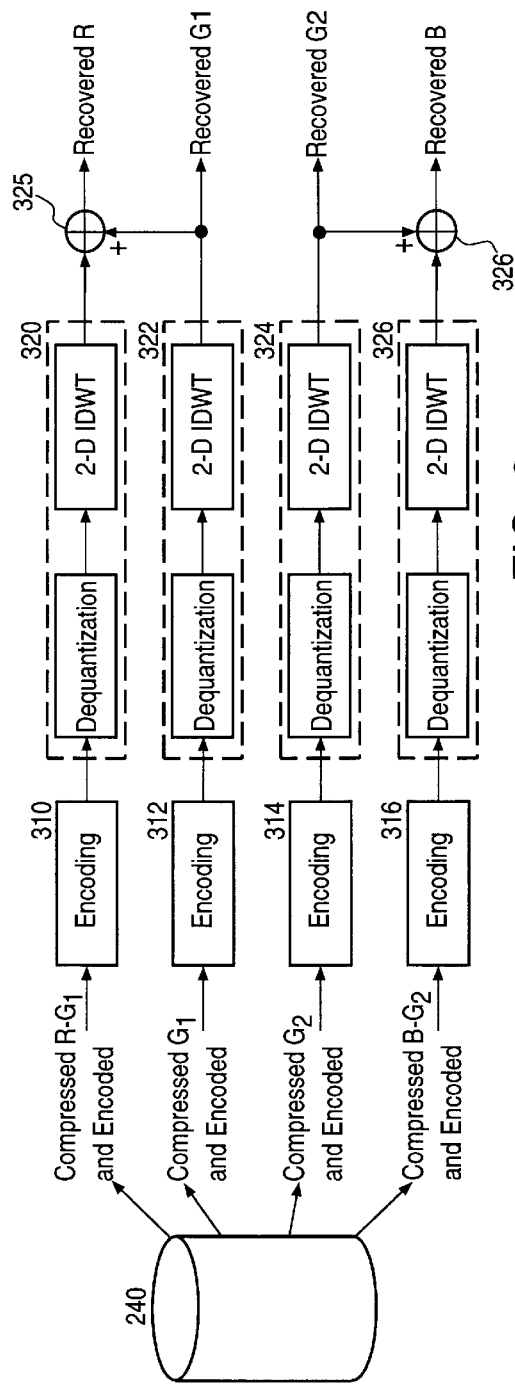
FIG. 3 illustrates recovery of a compressed and encoded image according to one embodiment of the invention.

FIG. 3 illustrates recovery of a compressed and encoded image according to one embodiment of the invention.

The decoding blocks, inverse quantization blocks and inverse DWT blocks comprise a process which attempts to recover the original image 200 from the compressed and encoded image data 240 (see FIG. 2). The decoded and decompressed image obtained will not be an exact pixel-for-pixel reconstruction of the original image, since the compression is "lossy". However, by utilizing DWT properties and perceptually lossless quantization techniques that are the subject of various embodiments of the invention, the loss can be made imperceivable to human vision, and thus the quality of the decompressed image is increased over other lossy techniques. Further, the ease of the inverse DWT procedure when compared with other inverse techniques makes it suitable for fast and easy implementation.

Figure 4:
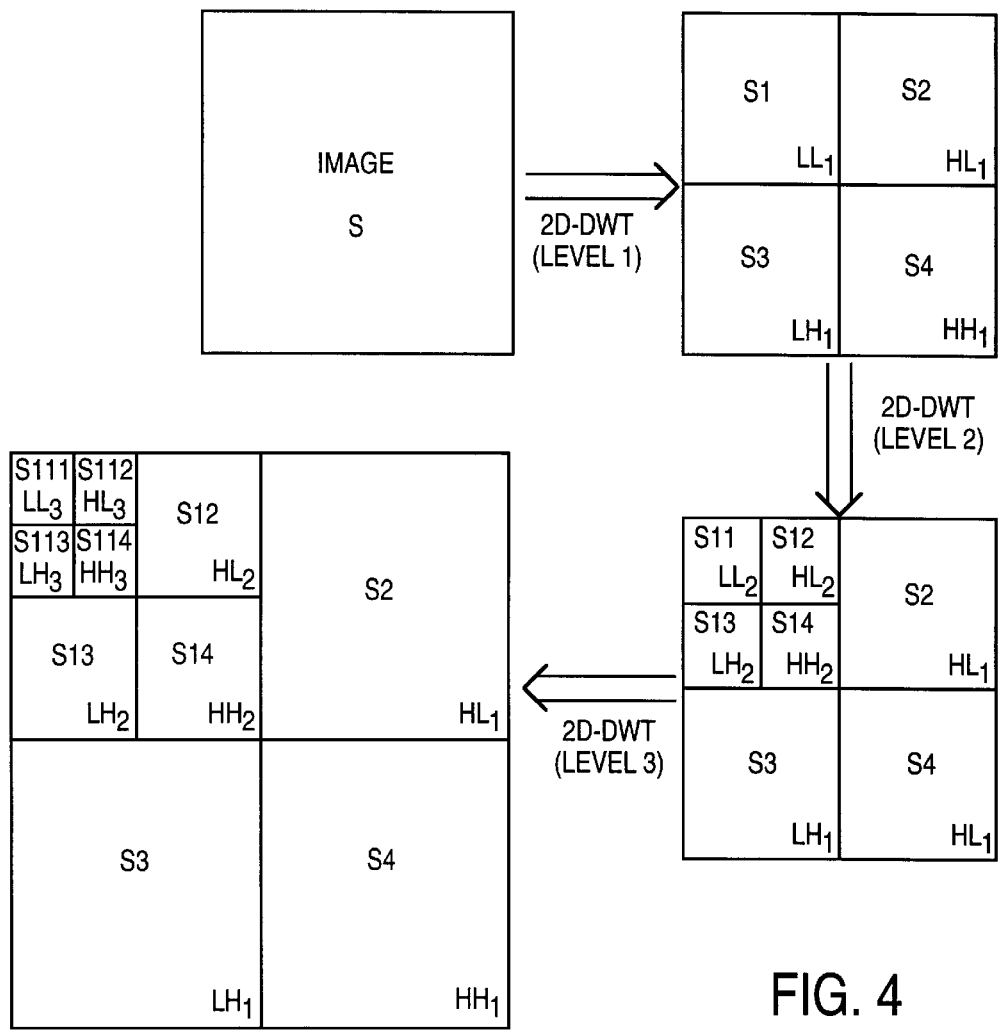
FIG. 4 shows the results of iteratively applying a 2-dimensional DWT to an image.

The compressed and encoded image data 240 may be efficiently stored channel by channel and sub-band by sub-band (see FIG. 4). Thus, the compressed and encoded channels (R–G1), G1, G2 and (B–G2) may be separately decoded and decompressed. First, the data belong to each channel is decoded (for instance, Zero Run length, Huffman decoding, etc.) (blocks 310, 312, 314 and 316). Each channel and sub-band of data, may have been encoded using techniques different from those of other sub-bands, and channels, thus, will need to be decoded taking any differences in encoding technique into account. Each channel of decoded data is then decompressed (blocks 320, 322, 324 and 326). As with the compression blocks shown in FIG. 2, the decompression consists of two procedures—dequantizing the decoded data and then performing an inverse DWT (IDWT).

The dequantization block will simply multiply the decoded data (which is the quantized DWT coefficients) values by the quantization threshold Q(s,c) for the given sub-band and appropriate channel. After dequantization, an inverse DWT is performed for each channel and sub-band's data. Once the IDWT is completed, an approximation of the original image 200 may be obtained pixel by pixel. By adding back G1 to the (R–G1) recovered value (block 325) and G2 to the (B–G2) recovered value (block 326), each Bayer pattern pixel value R, G1, G2 and B from the original sensor array 200 may be approximately recovered. The recovered R, recovered G1, recovered B2 and recovered B values may or may not be identical with the values of original image 200 but will show visually lossless or perceptionally lossless properties due to the exploitation of color channel correlation. Thus, the recovered image will be of high quality. According to another embodiment of the invention, the dequantization process may be merged with the inverse DWT by modifying the inverse DWT coefficients by the appropriate quantization thresholds.

The decompression can be implemented as hardware, software or from one or a combination thereof and can be separate physically from the apparatus performing the function of the encoding compression process. The basic data flow for lossy compression schemes consist of compression and decompression and often will also include an intermediate transfer from the compression block to the desired destination which has access to decompression capability.

FIG. 4 shows the results of iteratively applying a 2-dimensional (2-D) DWT to an image.

As described in co-pending U.S. patent application entitled, An Integrated Systolic Architecture for Decomposition and Reconstruction of Signals Using Wavelet Transforms, Ser. No. 08/767,976 (hereinafter "Patent Application '976"), application of 2-D DWT upon an image space will result in the creation of four "sub-bands." For instance, FIG. 4 shows that an image S is decomposed by the 2-D DWT into four sub-bands S1, S2, S3 and S4. Of these, the most critical sub-band is S1. The sub-band S1 is also referred to as the "LL" sub-band, based on the double low-pass filtering used to generate it. S1 (LL) is essentially in scaled approximation of the original image S, and contains the most salient image information. The sub-bands S2, S3 and S4 contain edge information and when the input image is noisy, also a considerable amount of that noise. The sub-bands S2, S3 and S4 are also referred to as HL, LH and HH sub-bands, respectively, due to the various low-pass and high-pass filtering used to generate them. Since the sub-bands S2, S3 and S4 are perceptually less significant than the S1 sub-band, these sub-bands may be more "roughly" quantized (i.e., assigned a higher threshold Q) so that the values therein are compressed greater. The S1 sub-band may not even need to be quantized directly, since this sub-band is utilized in generating higher level DWTs. As mentioned earlier, the original image, according to one embodiment of the invention, is subjected to a 2-D DWT channel by channel. The four channels utilized in one embodiment of the invention include (R-G1), G1, G2 and (B-G2). The data composing each of these channels may be considered an "image" in their own right upon whom a 2-D DWT is performed. The four sub-bands S1, S2, S3 and S4 constitute a level 1 DWT. Thus, the subscript 1 in FIG. 4 below the designations $LL_1$, $HL_1$, $LH_1$ and $HH_1$ indicate that these sub-bands belong to level 1.

The level 1 sub-bands S1, S2, S3 and S4 result from applying the 2-D DWT once to the image S. If the 2-D DWT is applied again, to the sub-band result S1, a two level 2-D DWT is said to have been performed. The level 2 2-D DWT would result in the generation of four new sub-bands S11, S12, S13 and S14 which are sub-bands generated from the sub-band S1 from the level 1 2-D DWT. These sub-bands S11, S12, S13 and S14 have the designation $LL_2$, $HL_2$, $LH_2$ and $HH_2$, respectively, since they are level 2 DWT sub-bands. Again, the $LL_2$ sub-band S11 contains the most salient features from S1 while the S12, S13, and S14 sub-bands contain edge and possibly noise information from the sub-band S1. The 2-D DWT may be thus applied many times to LL sub-band of each level to obtain more and more levels of DWT resolution and thus, image sub-bands. According to one embodiment of the invention, only a level 1 2-D DWT procedure is considered. If more levels of 2-D DWT processing occurs, each of the newly created sub-bands would be assigned a Q or quantization threshold for each channel present therein. The determination of the Q(s,c) value for a given sub-band "s" and channel "c" has been arrived at empirically for a 9-7 bi-orthogonal spline DWT filter. The results of this study are tabulated in FIG. 5.

FIG. 5 is a table of sample quantization threshold values for given sub-bands and channels.

The quantization thresholds Q(s,c) may be determined/selected in a wide variety of ways. In one study conducted in conceiving the various embodiments of the invention, empirical data regarding the perception of a group of observers to a set of DWT compressed images was collected. In these experiments, the thresholds Q(s,c) were increased until artifacting due to quantization was observable. A wide variety of images, each with differing characteristic, were selected for the study. The table of FIG. 5 illustrates the results of the study and are statistically assured to be applicable to any image provided that the 9-7 bi-orthogonal spline filter, which is well-known in the art, is used as a basis for the DWT. When a different technique such as DCT or different basis for DWT, is utilized, new quantization thresholds may need to be selected or determined since each filter renders differently the same image. In one embodiment of the invention, such values may be preloaded into a ROM or in another embodiment, these values may be written to a rewritable memory so that they can be modified.

Referring to FIG. 4, the sub-bands labeled S1, S2, S3 and S4 all belong to a level 1 DWT. The sub-band S4 has quantization thresholds approximate 5 times greater than the S2 and S3 sub-bands. Thus, the information (data values) in the S4 sub-band are quantized to a greater degree, and hence, more compressed. The error implicit in a higher quantization threshold and, consequently, fewer mapped values is tolerable since the S4 sub-band contains the least relevant visually perceptible image details, such as diagonal edges and noise. As mentioned above, S1 contains most of the salient and visually crucial information of the original image S. For a k level DWT, the lowest k-1 LL sub-bands are preserved (i.e., Q of 1) and thus not quantized since these sub-bands are themselves resolved further into higher level LL, LH, HL and HH sub-bands. The $LL_k$ or highest level DWT sub-band is quantized (Q>1) since there is no higher level resolution of LLk within which the quantization would have been accounted for. The sub-bands S2 and S3 for all levels have quantization thresholds that lie in-between S1 and S4 sub-bands of the same level.

With regard to channels, quantization thresholds were determined for R, G, B, and then (R–G1), and (B–G2). The G values hold true for both G1 and G2. In general, Blue can be quantized more roughly (with higher thresholds) than Green (G1, G2) and Red. However, in embodiment of the invention, the channels (R–G1) and (B–G2) rather pure R and B are considered in the compression process. These "difference" or decorrelated channels have much higher quantization thresholds than the pure color channels R, G, and B. This is due to the fact that the edge information of the image is accounted for in G1 and G2 planes (channels). When these G1 and G2 values are subtracted, from R and B plane values, respectively, the resulting difference preserves the chrominance component in R and B planes not found in G1 and G2. Thus, the difference channels (R–G1) and (B–G2) optimized the contribution of R and B planes to the overall image and its perceived quality. Observations have shown that the S4 sub-band in the difference channels (R–G1) and (B–G2) contain no image information that is perceptionally different from the information contained in G1 and G2 channels, and thus, zero values are assigned to the entire sub-band (a Q value of 00). The sub-band S4 does not need to be stored for the difference channels since there is no perceivable information, therein, according to one embodiment of the invention. The higher the DWT level, the more precision or resolution is obtained of the input sub-band LL of the previous level. Though a 3-level DWT is shown in FIG. 4, any number of DWT levels may be generated according to design needs.

Figure 6:
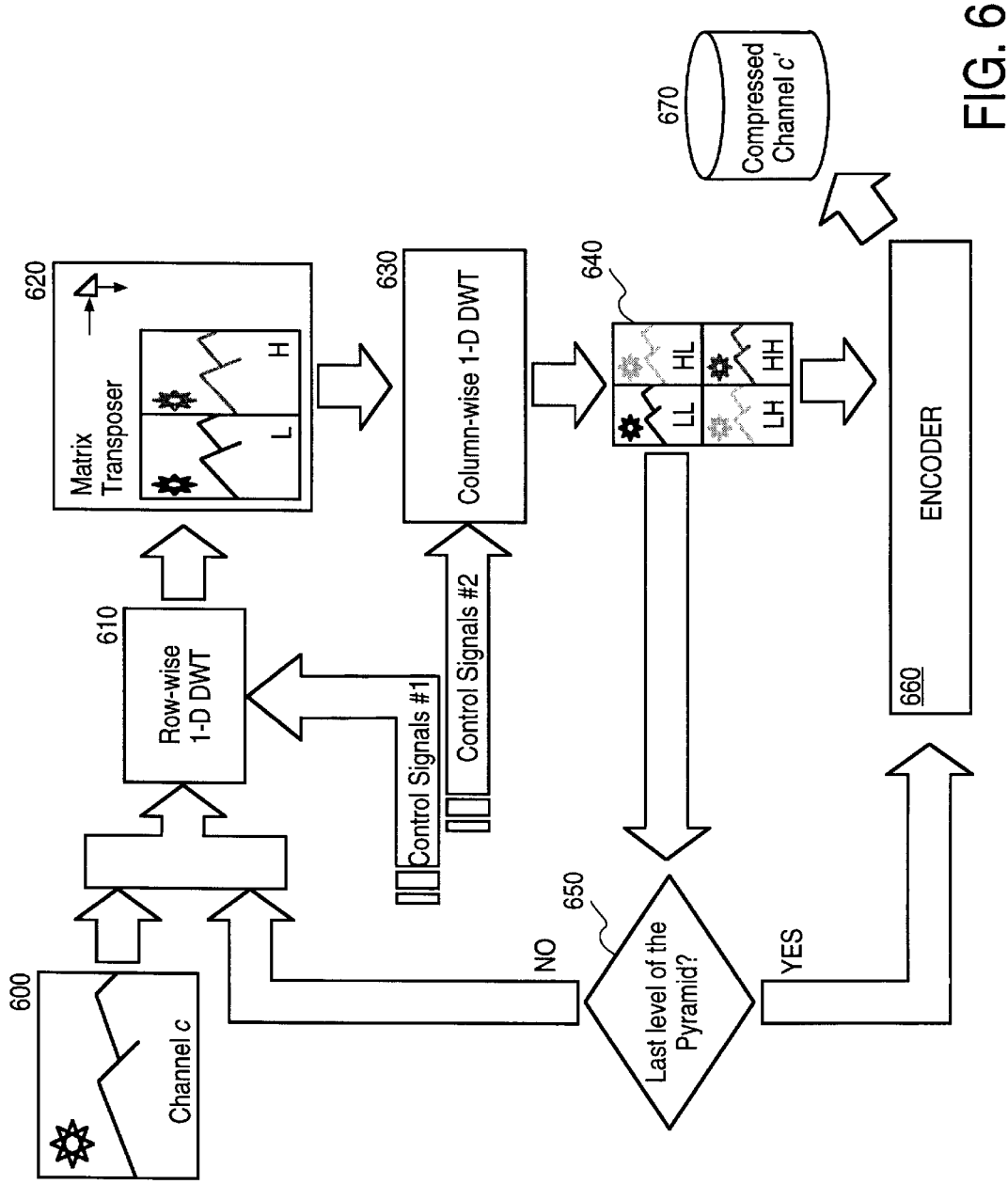
FIG. 6 is a block diagram of one embodiment of the invention.

FIG. 6 is a block diagram of one embodiment of the invention.

According to an embodiment of the invention described with respect to FIGS. 2 and 3, compression and decompression processes are divided into two stages—one for quantization (and dequantization) and another separate stage for the DWT (and inverse DWT). However, according to another embodiment of the invention, the quantization (dequantization) stages can be coalesced into the DWT (and inverse DWT). The DWT and inverse DWT outputs are generated by a set of cascading filters (see Patent Application '976) whose coefficients are the coefficients of the DWT (and inverse DWT) function. These coefficients are multiplied by input pixel values and the products selective added to generate the DWT outputs. If the quantization thresholds are combined algebraically with the DWT coefficients, quantization will be achieved during the DWT computation itself.

In the embodiment of FIG. 6, the 2-D DWT is implemented by repeating the one-dimensional (1-D) DWT twice. This approach is possible due to the separability of the DWT filters (see Patent Application '976). It may be possible to implement 2-dimensional DWT or other 2-dimensional transforms using a single bi-dimensional filter given that such a filter is feasible. By contrast, as outlined in Patent Application '976, the one-dimensional filter approach performs the DWT in a row-wise fashion and then in a column-wise fashion to the row-wise DWT result. For instance, consider a channel "c" 600 as shown in FIG. 6. This represents, in one embodiment of the invention, the pixel data from a particular color/difference channel, G1, G2, (R−G1) or (B−G2), but may also, in another embodiment, represent an entire image or image portion. First, a row-wise DWT is performed by the 1-D DWT module 610. A set of control signals #1 regulates the operation of this row-wise DWT and can supply coefficients depending on the level of the DWT (see below). The module 610 generates and "L" band and "H" band from the channel "c".

Once the row-wise DWT is performed, the resulting "L" and "H" bands are transposed by a matrix transposer circuit 620. Such matrix transposer circuits are well known in the art. The matrix transposer circuit 620 provides column-by-column the result from matrix transposer circuit 620 as input to the second 1-D DWT module 630. The second 1-D DWT module 630 is regulated and provided coefficients, if necessary, by means of a set of control signal #2. The result of performing a 1-D DWT column-wise on the 1-D DWT, row-wise data transposed from matrix transposer circuit 620 is shown as the 2-D DWT result data 640. Each pass through the row-wise, 1-D DWT, transpose and column-wise 1-D DWT is equivalent to performing a 2-D DWT. The result data 640 is composed sub-bands LL, HL, LH and HH and comprises one level of the DWT, as referred to and described in FIG. 4.

The process described above is to generate the results from one level of the DWT. If more than one level, such as three levels of DWT resolution is desired, then a counter may be utilized and loaded with the value 3. Each instance that a 2-D DWT cycle is completed, the count is decremented. A decision block 650 may check this counter to determine if another DWT level is needed. If another level is desired, the "LL"—sub-band is piped back into the 2-D DWT process to generate another set of sub-bands therefrom. FIG. 4, for instance, shows a 3-level 2-D DWT result. At each level, the sub-band $LL_k$, where k is the level, is used as the input and then decomposed into four further sub-bands by use of the 2-D DWT. This procedure repeats until the last desired level of DWT resolution is reached. Also, when each level of the DWT is complete, the sub-bands HL, LH and HH are sent to an encoder 660 which performs binary encoding such as Huffman or Run Length Encoding upon the data. The encoded data is then stored as a portion of a compressed channel c'670. At each level before the last level of DWT resolution, the LL sub-band is not encoded since it is being fed back to the 2-D DWT process to generate further sub-bands. At the last level of the DWT, the LL sub-band is sent to be encoded by encoding 660. The output of encoder 660 is stored and assembled and will constitute a compressed channel c'670 when complete. In the above-described manner, each of the channels R−G1, G1, G2 and B−G2 processed into compressed channels.

To achieve quantization during the DWT filtering (performed by DWT modules 610 and 630), the filtering coefficients must be modified by the quantization coefficients Q(s,c), where s is the sub-band and c, the channel. The modification of the DWT coefficients varies according to the nature of the filter and the sub-band being processed and is summarized below:

ROW-WISE 1-D DWT:

low-pass filtering over the $LL_{k-1}$ sub-band (or over the source image for k=1) (generation of the sub-band L): each weight (coefficient) $l_i$ of the filter is scaled by the factor:

$$\frac{1}{\sqrt{Q(LL_K, c)}}$$

high-pass filtering over the $LL_{k-1}$ sub-band (or over the source image) (generation of the sub-band H): each weight (coefficient) $h_i$ of the filter is scaled by the factor:

$$\frac{\sqrt{Q(LL_k, c)}}{Q(HL_k, c)};$$

Figure 7:
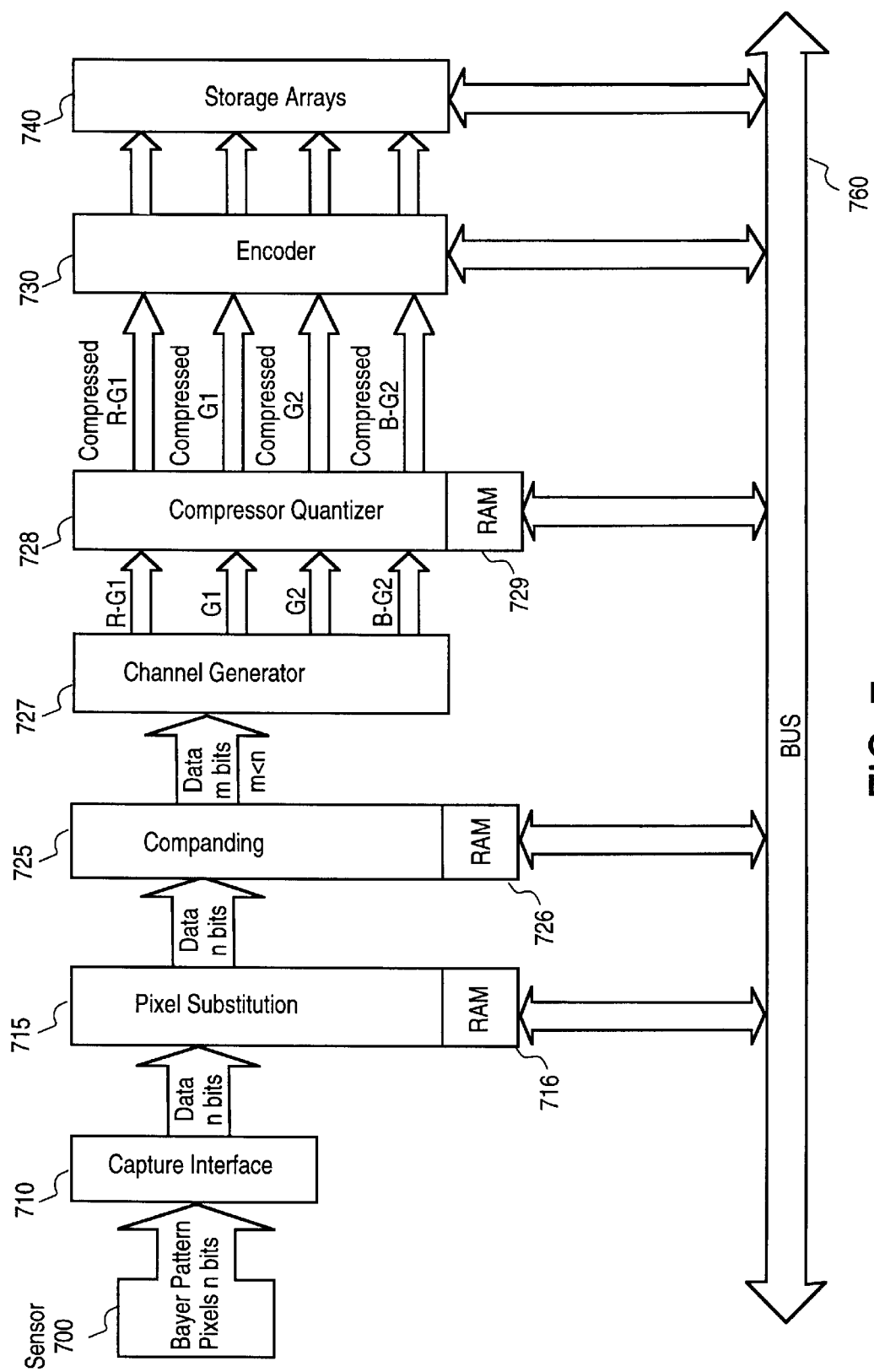
FIG. 7 is a block diagram of an image processing apparatus according to an embodiment of the invention.

COLUMN-WISE 1-D DWT:

low-pass filtering over the L and H sub-bands (generation of the sub-bands LL and LH): each weight (coefficient) $l_i$ of the filter is scaled by the factor:

$$\frac{1}{\sqrt{Q(LL_K, c)}}$$

high-pass filtering over the L sub-band (generation of the sub-band HL): each weight (coefficient) $h_i$ of the filter is scaled by the factor:

$$\frac{\sqrt{Q(LL_k, c)}}{Q(HL_k, c)}$$

high-pass filtering over the H sub-band (generation of the sub-band HH): each weight (coefficient) $h_i$ of the filter is scaled by the factor:

$$\frac{(HL_k, c)}{Q(HH_k, c)\sqrt{Q(LL_k, c)}};$$

where $Q(HL_k, c)$, $Q(HH_k, C)$ and $Q(LL_k, c)$ are respectively the perceptually lossless thresholds of the sub-bands HL, HH and LL in the $k^{th}$ level for the channel c. The above conditions directly achieve the quantization since $Q(HL_k, c)=Q(LH_k, c)$. In fact, after the row-wise and the column-wise filtering the four sub-bands, at any level, result in being scaled (i.e., quantized), respectively by the factors:

- LL sub-band: $\dfrac{1}{\sqrt{Q(LL_K, c)}} \dfrac{1}{\sqrt{Q(LL_K, c)}} = \dfrac{1}{Q(LL_K, c)}$;

- LH sub-band: $\dfrac{1}{\sqrt{Q(LL_k, c)}} \dfrac{\sqrt{Q(LL_k, c)}}{Q(HL_k, c)} \dfrac{1}{\sqrt{Q(LL_k, c)}} = \dfrac{1}{Q(HL_k, c)}$;

- HL sub-band: $\dfrac{\sqrt{Q(LL_k, c)}}{Q(HL_k, c)} \dfrac{1}{\sqrt{Q(LL_k, c)}} \dfrac{\sqrt{Q(LL_k, c)}}{Q(HL_k, c)} = \dfrac{1}{Q(HL_k, c)}$;

- HH sub-band: $\dfrac{\sqrt{Q(LL_k, c)}}{Q(HL_k, c)} \dfrac{Q(HL_k, c)}{Q(HH_k, c)\sqrt{Q(LL_k, c)}} = \dfrac{1}{Q(HH_k, c)}$;

FIG. 7 is a block diagram of an image processing apparatus according to an embodiment of the invention.

FIG. 7 is a block diagram of internal image processing and compression components of an imaging device incorporating at least one embodiment of the invention. In the exemplary circuit of FIG. 7, a sensor 700 generates pixel components which are color/intensity values from some scene/environment. The n-bit pixel values generated by sensor 700 are sent to a capture interface 710. Sensor 700 in the context relating to the invention will typically sense one of either R, G, or B components from one "sense" of an area or location. Thus, the intensity value of each pixel is associated with only one of three color planes and may form together a Bayer pattern such as that shown above. Capture interface 710 resolves the image generated by the sensor and assigns intensity values to the individual pixels. The set of all such pixels for the entire image is in a Bayer pattern in accordance with at least one of the embodiments of the invention.

It is typical in any sensor device that some of the pixel cells in the sensor plane may not respond to the lighting condition in the scene/environment properly. As a result, the pixel values generated from these cell may be defective. These pixels are called "dead pixels." The "pixel substitution" unit 715 replaces each dead pixel by the immediate previously valid pixel in the row.

A RAM table 716 consists of the row and column indices of the dead pixels, which are supplied by the sensor. This RAM table 716 helps to identify the location of dead pixels in relation to the captured image. Companding module 725 is circuit designed to convert each original pixel of n-bit (typically n=10) intensity captured from the sensor to an m-bit intensity value, where m<n (typically, m=8). Companding module 725 is not needed if the sensor 700 and capture interface 710 provide an m-bit per-pixel value.

According to at least one embodiment of the invention, as described above, sets of m-bit pixel value(s) may be directly compressed without resorting to color interpolation and/or color space conversion. Channel generator 727 is coupled to companding module 725 and can receive therefrom m-bit pixel data values which may be arranged according to the Bayer pattern. Each m-bit value is used by channel generator to generate the four channels (R−G1), G1, G2 and (B−G2). For instance, if pixels are captured row-by-row, a first row would yield R and G1 pixel values and thus outputs only at channels (R−G1) and G1. The next captured row would yield G2 and (B−G2) channels. The channel generator 727 sends two channels during one row, and the other remaining two channels during the next row. These channels are then input to a compressor/quantizer 728. A RAM table 729 can be used to store DWT coefficients and/or quantization thresholds for each channel/sub-band as desired in executing the compression techniques described above. Further, add and multiply units, shifters, and control signaling can be provided in compressor/quantizer 728 to carry out the necessary DWT computation (see Patent Application '976). Compressor/quantizer 728 can be designed to provide high-pass and low-pass DWT outputs for each channel and sub-band. These compressed channel outputs, which represent the compressed image data, are then binary encoded by an encoder 730. Encoder 730 may use run-length, Huffman or other suitable coding to pack the compressed data for storage into storage array(s) 740.

Each of the RAM tables 716, 726 and 729 can directly communicate with bus 760 so that their data can be loaded and then later, if desired, modified. Further, those RAM tables and other RAM tables may be used to store intermediate result data as needed. Though the individual components (selectors, shifters, registers, add, multiply units and control/address signals) of modules 727, 728 and 730 have not been detailed, one skilled in the art will readily be able to implement such a device, given the details set forth for various embodiments of the invention.

Figure 8:
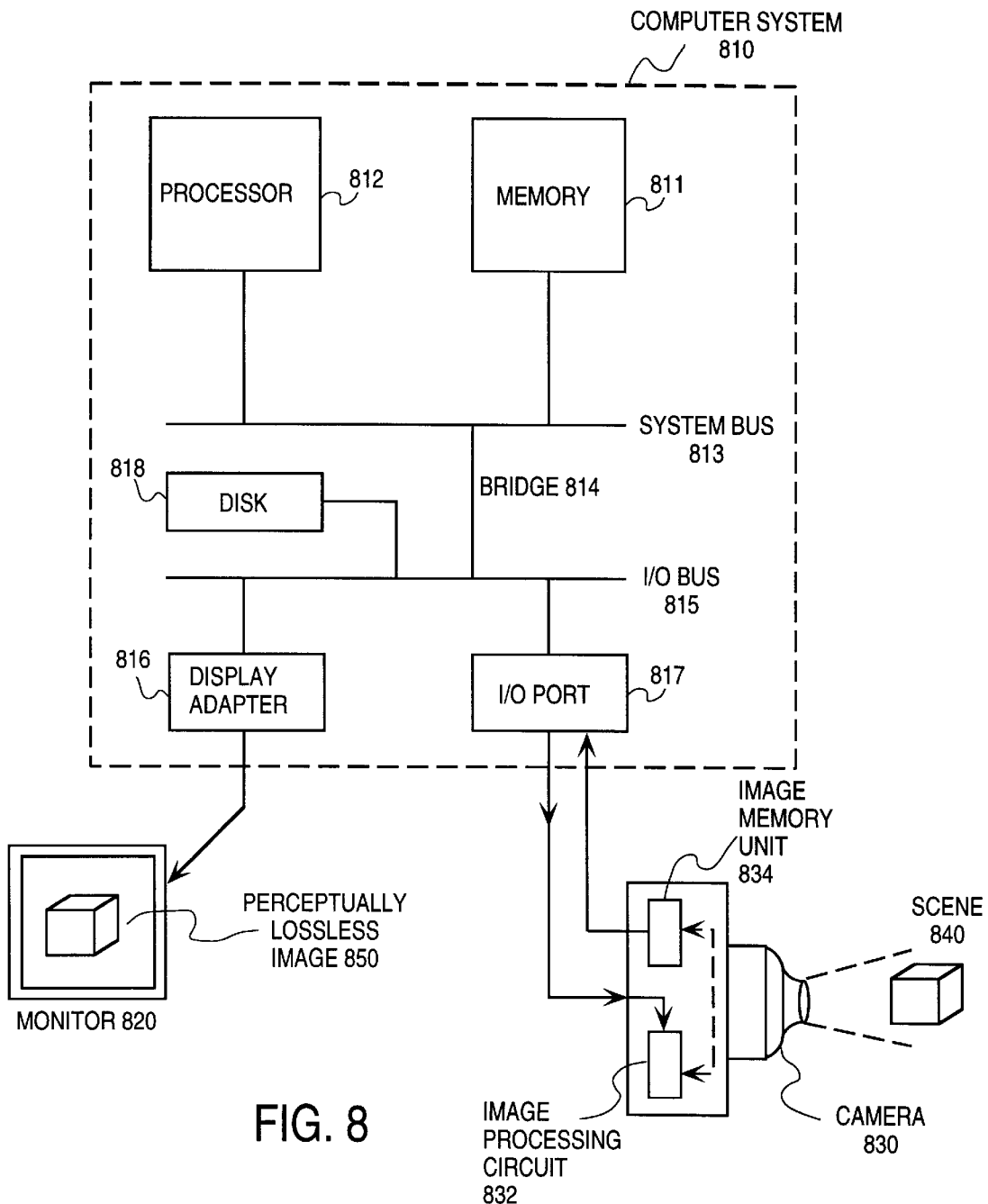
FIG. 8 is a system diagram of one embodiment of the invention.

FIG. 8 is a system diagram of one embodiment of the invention.

Illustrated is a computer system 810, which may be any general or special purpose computing or data processing machine such as a PC (personal computer), coupled to a camera 830. Camera 830 may be a digital camera, digital video camera, or any image capture device or imaging system, or combination thereof and is utilized to capture an image of a scene 840. Essentially, captured images are processed by an image processing circuit 832 so that they can be efficiently stored in an image memory unit 834, which may be a ROM, RAM or other storage device such as a fixed disk. The image contained within image memory unit 834 that is destined for computer system 810 can be according to one embodiment of the invention, stored directly as a compressed image. In most digital cameras that can perform still imaging, images are stored first and downloaded later. This allows the camera 830 to capture the next object/scene quickly without additional delay. The invention in its various embodiments, particularly in providing a compressed image that is directly converted from the captured 8-bit Bayer pattern, reduces the computation requirements of the camera 830 and the associated costs, allowing for a more inexpensive camera.

The image processing circuit 832 carries out the compression, quantization and encoding, directly from the Bayer pattern sense (with other intermediate steps such as pixel substitution or companding, see FIG. 7 and associated description) of camera 830 in this embodiment of the invention. When a compressed and encoded image is downloaded to computer system 810, it may be rendered to some output device such as a printer (not shown) or to a monitor device 820. If, according to one embodiment of the invention, the image is in Bayer pattern format after being decompressed, it may need to be converted to an RGB full color resolution format prior to rendering. Image decompression may be achieved using a processor 812 such as the Pentium® (a product of Intel Corporation) and a memory 811, such as RAM, which is used to store/load instruction addresses and result data and is a well-known operation in the art of colorimetry.

In an alternate embodiment, the compression process described above may be achieved in a software application running on computer system 810 rather than directly in camera 830. In such an embodiment, the image processing circuit may advantageously store only the Bayer pattern image. The application(s) used to perform the integrated color interpolation and color space conversion after download from camera 830 may be from an executable compiled from source code written in a language such as C++. The instructions of that executable file, which correspond with instructions necessary to scale the image, may be stored to a disk 818 or memory 811. Further, such application software may be distributed on a network or a computer-readable medium for use with other systems. It would be readily apparent to one of ordinary skill in the art to program a computing machine to perform perceptually lossless quantized DWT compression an image if the methodology described above is followed.

When an image, such as an image of a scene 840, is captured by camera 830, it is sent to the image processing circuit 832. Image processing circuit 832 consists of ICs and other components which execute, among other functions, the DWT based perceptually lossless compression of an image. The image memory unit 834 will store the compressed channel data. Once all pixels are processed and stored or transferred to the computer system 810 for rendering the camera 830 is free to capture the next image. When the user or application desires/requests a download of images, the imaged stored in the image memory unit, whether stored as XYZ space images or as Bayer pattern images, are transferred from image memory unit 834 to the I/O port 817. I/O port 817 uses the bus-bridge hierarchy shown (I/O bus 815 to bridge 814 to system bus 813) to temporarily store the XYZ color space image data into memory 811 or, optionally, disk 818. Computer system 810 has a system bus 813 which facilitates information transfer to/from the processor 812 and memory 811 and a bridge 814 which couples to an I/O bus 815. I/O bus 815 connects various I/O devices such as a display adapter 816, disk 818 and an I/O port 817, such as a serial port. Many such combinations of I/O devices, buses and bridges can be utilized with the invention and the combination shown is merely illustrative of one such possible combination.

In one embodiment of the invention, the compressed images can be decompressed/recovered to a perceptually lossless version on computer system 810 by suitable application software (or hardware), which may utilize processor 812 for its execution. A full resolution RGB image may be created by color interpolation data and then be rendered visually using a display adapter 816 into a perceptually lossless image 850. Since color interpolation and color space conversion are readily facilitated on-camera in one embodiment of the invention, it may be possible to implement a communication port in camera 830 that allows the image data to be transported directly to the other devices.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than restrictive.

The exemplary embodiments described herein are provided merely to illustrate the principles of the invention and should not be construed as limiting the scope of the invention. Rather, the principles of the invention may be applied to a wide range of systems to achieve the advantages described herein and to achieve other advantages or to satisfy other objectives as well.

What is claimed is:

1. A method comprising:
    splitting raw image data into a plurality of channels which include one or more color plane difference channels, the splitting includes arranging a first color plane of the raw image data into a first color channel and a second color channel, generating a first difference channel that differences said first color channel from values associated with a second color plane of the raw image data, and generating a second difference channel that differences said second color channel from values associated with a third color plane of the raw image data, said first color plane having twice the number of associated values as values associated with either said second or third color plane; and
    compressing separately each of said channels using a two-dimensional discrete wavelet transform, said compression utilizing quantization.

2. A method according to claim 1 wherein said first color plane is Green.

3. A method according to claim 1 wherein said second color plane is Red.

4. A method according to claim 1 wherein said third color plane is Blue.

5. A method according to claim 1 wherein said raw image data is arranged in a Bayer pattern.

6. A method according to claim 5 wherein said values of the first color channel are located on a first row in the Bayer pattern and values of the second color channel are located on a second row in the Bayer pattern, said second row immediately succeeding said first row.

7. A method according to claim 1 wherein the compressing includes:
    performing a two-dimensional discrete wavelet transform (2-D DWT) on each channel, generating thereby for each channel a set of sub-bands, including LL sub-band containing salient channel information, the performing constituting a level of the 2-D DWT;
    if further resolution is desired, performing a 2-D DWT on the LL sub-band of each channel generated in the preceding level, generating thereby four new sub-bands and constituting a further level of the 2-D DWT; and
    quantizing said sub-bands of the 2-D DWT at each level, a separate quantization threshold defined for each said sub-band in each said channel at each level.

8. A method according to claim 7 wherein the performing a 2-D DWT includes:
    performing a one-dimensional discrete wavelet transform (1-D DWT) row-wise to generate an "L" band and "H" band therefrom;
    matrix transposing said "L" band and "H" band; and
    performing a 1-D DWT column-wise on said "L" and "H" bands to generate therefor said LL, an LH, an HL and an HH sub-band.

9. A method according to claim 7 wherein the quantizing includes:
    dividing each of the values in each sub-band in each channel by the corresponding quantization threshold; and
    rounding to the nearest integer the result of said division, said rounding yielding a quantized of the value version from said sub-band and said channel.

10. A method according to claim 1 wherein the compressing includes:
    performing a two-dimensional discrete wavelet transform (2-D DWT) on each channel, generating thereby for each channel a set of sub-bands including an LL sub-band containing salient image information, said transform including filtering coefficients modified by quantization thresholds, said thresholds defined for each channel in each sub-band, the performing constituting a level of the 2-D DWT; and if further resolution is desired, performing a 2-D DWT on each channel of the LL sub-band generated in the preceding level, generating thereby four new sub-bands and constituting a further level of the 2-D DWT.

11. A method according to claim 10 wherein the modification of filtering coefficients varies according to the high-pass or low-pass nature of the filtering coefficients.

12. A method according to claim 1, further comprising decompressing said compressed channel data.

13. An apparatus for processing an image comprising:
a channel generator configured to generate both color difference channels and color channels from said image by arranging a first color plane of the raw image data into a first color channel and second color channel, generating a first difference channel that differences said first color channel from values associated with a second color plane of the raw image data, and generating a second difference channel that differences said second color channel from values associated with a third color plane of the raw image data, said first color plane having twice the number of associated values as values associated with either said second or third color plane; and a compressor coupled to said channel generator to compress each channel generated by said channel generator using a two-dimensional discrete wavelet transform module (2-D DWT) for each channel.

14. An apparatus according to claim 13 wherein
said 2-D DWT module is configured to generate a set of sub-band outputs for each channel, including a low-low (LL) sub-band.

15. An apparatus according to claim 14 wherein said compressor further comprises:
a quantizer coupled to each said 2-D DWT module, said quantizer mapping the set of possible output values from each said 2-D DWT module to subset of values therefrom, said mapping varying for each sub-band in each channel.

16. An apparatus according to claim 15 wherein the compressor is further configured to perform multiple levels of the 2-D DWT, and
if further resolution is desired, the compressor is capable of performing a 2-D DWT on at least one of said sub-bands of each channel generated in the preceding level, generating thereby a new set of sub-bands and constituting a further level of the 2-D DWT; and wherein the quantizer is capable of quantizing said sub-bands of the 2-D DWT at each level, using a separate quantization threshold defined for each said sub-band in each said channel at each level.

17. An apparatus according to claim 14 wherein each said 2-D DWT module utilizes quantization threshold modified filtering coefficients, said quantization threshold modification varying according to the particular sub-band, channel and nature of the filtering coefficients.

18. An apparatus according to claim 14 wherein said 2-D DWT module comprises:
a first one-dimension discrete wavelet transform (1-D DWT) module configured to perform a row-wise DWT, to generate thereby an "L" and an "H" bands;

a matrix transposer coupled to said first 1-D DWT module to receive said "L" and "H" bands, said transposer configured to transpose rows for columns in the channel data; and a second 1-D DWT module coupled to receive said transposed "L" and "H" band data, and operating upon said data to perform a column-wise DWT, said second 1-D DWT module configured to generate thereby a complete DWT level comprising said LL sub-band and an LH, HL, and HH sub-bands.

19. A system comprising:
an image processor, said processor configured to (1) split raw image data into a plurality of channels which include one or more color plane difference channels, by arranging a first color plane of the raw image data into a first color channel and second color channel, generating a first difference channel that differences said first color channel from values associated with a second color plane of the raw image data, and generating a second difference channel that differences said second color channel from values associated with a third color plane of the raw image data, said first color plane having twice the number of associated values as values associated with either said second or third color plane, and (2 compress said channels using quantization and discrete wavelet transforms; and an image memory coupled to said processor, said memory configured to store said compression channel data.

20. A system according to claim 19 further comprising:
a computer system coupled to said image memory to receive said compressed channel data and configured to decompress said compressed channel data lossless image.

21. A system comprising:
an optical subsystem configured to guide light;
an image sensor positioned to receive the light and in response generate pixel values representative of said light, said pixel values to be stored as raw image data;
an image processor coupled to the image sensor, said processor configured to split the raw image data into a plurality of channels which include one or more color plane difference channels, by arranging a first color plane of the raw image data into a first color channel and second color channel, generating a first difference channel that differences said first color channel from values associated with a second color plane of the raw image data, and generating a second difference channel that differences said second color channel from values associated with a third color plane of the raw image data, said first color plane having twice the number of associated values as values associated with either said second or third color plane, said processor being capable of compressing said channels using quantization and discrete wavelet transforms; and an image memory coupled to said processor to store said compression channel data.

22. A system according to claim 21, wherein said optical subsystem is part of a digital camera.

23. A system according to claim 21, wherein said optical subsystem is part of a scanner.

24. A method comprising:
reading compressed image data as a plurality of channels which includes one or more compressed color plane difference channels;
decompressing separately each of said channels using a two-dimensional discrete wavelet transform to yield first and second difference channels of said decompressed image; and summing the first and second difference channels with values taken from separate color planes of the decompressed image to yield first and second color channels that together completely define another color plane of the decompressed image.

25. A method according to claim 24, wherein decompressing includes:

decoding said compressed image data channel by channel;

inverse quantizing said decoded data; and performing an inverse 2-dimensional DWT upon said inverse quantized data, the result being recovered channel data.

26. A method according to claim 25 wherein said recovered channel data is added selectively together to recover raw image color plane data.

27. An article comprising:

a machine-readable medium containing instructions which when executed by a machine cause the machine to perform operations comprising splitting raw image data into a plurality of channels which includes one or more color plane difference channels, the splitting includes arranging a first color plane of the raw image data into a first color channel and a second color channel, generating a first difference channel that differences said first color channel from values associated with a second color plane of the raw image data, and generating a second difference channel that differences said second color channel from values associated with a third color plane of the raw image data, said first color plane having twice the number of associated values as values associated with either said second or third color plane, and compressing separately each of said channels using a two-dimensional discrete wavelet transform, said compression utilizing quantization.

28. An article comprising:

a machine-readable medium containing instructions which when executed by a machine cause the machine to perform operations comprising reading compressed image data as a plurality of channels which includes one or more compressed color plane difference channels;

decompressing separately each of said channels using a two-dimensional discrete wavelet transform to yield first and second difference channels of said decompressed image; and summing the first and second difference channels with values taken from separate color planes of the decompressed image to yield first and second color channels that together completely define another color plane of the decompressed image.

* * * * *

UNITED STATES PATENT AND TRADEMARK OFFICE
CERTIFICATE OF CORRECTION

PATENT NO. : 6,154,493
DATED : November 28, 2000
INVENTOR(S) : Acharya et al.

It is certified that error appears in the above-identified patent and that said Letters Patent is hereby corrected as shown below:

<u>Column 16,</u>
Line 32, delete "lossless image".

Signed and Sealed this

Fourteenth Day of May, 2002

*Attest:*

*Attesting Officer*

JAMES E. ROGAN
*Director of the United States Patent and Trademark Office*